Figure 1:

(No Model.)

E. THOMSON.
MANUFACTURING CHAINS BY ELECTRIC WELDING PROCESS.

No. 449,356.  Patented Mar. 31, 1891.

WITNESSES:

INVENTOR
Elihu Thomson
BY
ATTORNEY.

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

MANUFACTURING CHAINS BY ELECTRIC-WELDING PROCESSES.

SPECIFICATION forming part of Letters Patent No. 449,356, dated March 31, 1891.

Application filed April 23, 1890. Serial No. 349,156. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Welding of Chains, of which the following is a specification.

My invention consists in an improvement in the method of manufacturing chains, and is applicable to chains made by bending wire or metal into the desired form for each link, as well as to those forms of chain in which each link consists of a piece of sheet metal cut at one side to permit one link to be threaded in the other.

My invention consists, essentially, in constructing each link of a single continuous piece of metal, the opposite ends of which are abutted at the joint of the loop or link, heating each link at the joint, as well as at the continuous part of the link opposite thereto, and then subjecting the link to pressure in a line transverse to the line connecting the joint and the opposite heated portion.

My invention consists, further, in an improved method of manufacturing chains having a protuberance or an enlargement at the side or end of the link.

My invention consists, further, in certain improvements in the manufacture of chains having twisted links.

My invention relates, also, to a novel process or method of making chains, which consists in forming a chain with its successive members linked or threaded together, but without joint or weld, and subsequently thereto welding the links either consecutively or all together to form the complete welded chain. In carrying out this part of my invention I preferably form each link by taking a suitable section of metal and bending it to approximately the desired form, at the same time threading the bent link through a previously-formed link or bent link. Proceeding in this manner, I construct a chain of any suitable extent and then weld the chain at the meeting ends of each link, preferably by the electric-welding process. In carrying out this part of my invention I may produce the welded joint either with or without the production simultaneously of a protuberance or enlargement at the opposite side or end of the link, though I prefer to heat both sides of the link—that is to say, to heat the link at the joint or point where the weld is to be formed, as well as at the opposite side, since, particularly in the production of small chains, it is easier to include both sides of the link in the clamping devices and to pass a current through both sides simultaneously, so as to heat them to the welding and upsetting temperature.

Figure 2:
Figure 3:
Figure 4:
Figure 5:
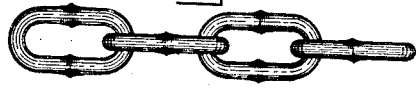
Figure 10:
Figure 6:
Figure 11:
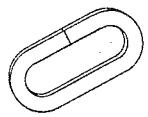
Figure 7:
Figure 8:
Figure 9:
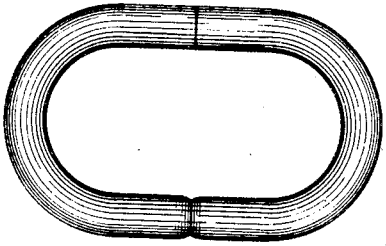

In the accompanying drawings, Figure 1 shows a piece of metal which may be bent to the shape shown in Fig. 2 in order to form one link of a chain. Fig. 3 shows several links of a chain made from the link shown in Fig. 2 prior to the heating operation. Fig. 4 illustrates the shape of a single link, such as shown in Fig. 2, after it has been subjected to the heating and compressing operation. Fig. 5 shows the chain completed. Fig. 6 shows the twisted link made in accordance with my invention. Fig. 7 shows a chain made from links such as shown in Fig. 6. Fig. 8 illustrates a detail of the manufacture of links made from heavy metal. Fig. 9 shows in plan a shape which I prefer to give to a link when made of heavy metal. Fig. 10 illustrates a modification in the shape of a link. Fig. 11 shows in plan a link of sheet metal which may be used in manufacturing chains in accordance with my invention.

In Fig. 2 I have shown one link of a chain, which is made into oval form by taking a piece of wire or metal of the shape shown in Fig. 1 and bending it so that its ends will abut at the side of the link. The blanks, Fig. 1, may be made by cutting off wire unwound from a reel into suitable lengths. The opposite ends of the piece of metal wire might be made to abut either at the side or at the end of the link, though in the case of an oval link I prefer to locate the joint at the side. Two or more such links as are shown in Fig. 2 may be joined, as shown in Fig. 3, by threading each through a previously-formed link at the time of bending.

After the links are connected, as shown in Fig. 3, each one is placed in suitable clamps or holders of an electric-welding or similar machine, and a heating electric current is passed through the two sides of the link, so as to heat the metal not only at the joint, but at the continuous portion of the link opposite thereto. After heating the metal to the desired plasticity it is subjected to end pressure, thus not only welding the two ends of the link together at the joint, but also forming an upset or expansion at the opposite or continuous portion thereof, as indicated in Figs. 4 and 5. This operation may be performed as each link is threaded through a previously-constructed link of the chain; but I preferably form a considerable length of chain—as illustrated, for instance, in Fig. 3—the successive links being simply linked or threaded together, but left unwelded at the meeting ends. After forming such an unwelded chain the joints are formed by taking the links in any desired sequence or by placing them all together simultaneously in any suitable clamps so as to cause the electric current to pass through them at the point where the weld is to be formed. In this operation, as before stated, I may at the same time heat the side of the link opposite the joint or may leave it unheated. By this procedure I facilitate considerably the manufacture of the welded chain of high tensile strength, since any desired length of chain, as illustrated in Fig. 3, may be first formed by suitable machinery which will bend and link the parts together, and afterward the length of chain so formed may be subjected to the welding operation necessary to close each link completely. It is obvious that this method of procedure becomes possible because I am enabled by utilizing the electric welding process to localize the heat at each point where the weld is to be effected, whereas with previous methods of welding the chain formed of the bent and unwelded links could not be constructed in the manner before described, since the links, being placed in a furnace, would be welded together where they touched. It will of course be understood that the clamps of the welding apparatus are to be adapted to the shape of the link or chain; but heating electric current might be furnished from any desired source for the purpose of heating the metal to desired plasticity.

In Fig. 6 I have shown a link which is like that of Fig. 5, with the exception that it has been twisted. Each link of the chain may be thus threaded, and a chain like Fig. 7 will be produced.

When links of heavy metal are employed, I reduce the diameter of the metal at the point opposite the joint, as indicated in Figs. 8 and 9. By this means the resistance at the continuous portion of the link is increased, so that it will heat at about the same rate as the metal at the abutting ends of the link.

Fig. 11 shows a sheet-metal link, which may be made by stamping from sheet metal and by cutting at one side of the link to permit the metal to be sprung to one side for the insertion of another link. To complete the chain, each link is subjected to the operation before described of heating the metal at the joint or abutting ends of the continuous blank and at the continuous portion of the metal opposite the joint, so as to form the welded joint and at the same time an upset or expansion on the opposite side.

As before described in connection with the formation of chain from bent metal, it is obvious that in the case of a chain made from sheet-metal links the same procedure might be adopted of forming a length of chain each link of which is threaded or connected to its adjoining link, but is left unwelded at the joint, and subsequently welding or uniting the free ends of each complete link, so as to completely close the link by welded metal.

As before stated, the point of abutment where the weld is formed may be at any portion of the link and might even be at the end thereof, as indicated by the dotted line, Fig. 2. The link may be more conveniently manipulated, however, in the clamps of the electric heating apparatus when the point of abutment is at the side, as shown in Fig. 2.

It is obvious that the metal for forming each link of the chain in the manner hereinbefore described is applicable to making rings or other metal objects of endless form or shape by simply taking a single piece of metal of the proper length, bending or conforming it to the desired shape, with its ends in abutment, and then heating the joint and the portion of the metal blank at a diametrically-opposite part, so as to soften it in the manner described, and then applying the endwise pressure to form the joint and at the same time expand the metal at the continuous part of the blank.

What I claim as my invention is—

1. The herein-described improvement in manufacturing chains, which consists in constructing each link as a single continuous piece of metal, the ends of which are abutted at the joint of the loop or link, heating the joint and the continuous part of the link opposite thereto by an electric current, and then subjecting the link to pressure in a line transverse to the line connecting the chain and the opposite continuous heated portion, as and for the purpose described.

2. The herein-described improvement in manufacturing chains, consisting in forming each loop from a single continuous piece of metal, the opposite ends of which are abutted at the side of the loop, passing an electric current through the link longitudinally, so as to heat the metal at the joint and at the opposite continuous portion of the link, and then subjecting such link to endwise pressure, so as to weld the abutted portions and to upset the metal at the opposite side of the link.

3. The herein-described improvement in manufacturing chains, which consists in bending a continuous piece of metal into the form of the link, with its ends abutting at one side thereof, passing a heating electric current through the link longitudinally, so as to heat the abutted ends, as well as the opposite continuous side of the link, and then subjecting the link to end pressure, as and for the purpose described.

4. The herein-described improvement in manufacturing chains, which consists in constructing each link of a single continuous piece of metal, the opposite ends of which abut, while the continuous portion of the metal at the opposite side of the link is reduced in cross-section, passing a heating electric current through both sides of the link, and then subjecting the link to pressure, as and for the purpose described.

5. The herein-described improvement in manufacturing links, which consists in forming each link of a continuous piece of metal, the opposite ends of which are abutted at the joint, while the opposite continuous portion of the link is of reduced cross section, passing an electric current through both sides of the link simultaneously, and then subjecting such link to end pressure, as and for the purpose described.

6. The herein-described improvement in making rings, links, or other metal objects of endless form, consisting in bending or forming a piece of metal to the shape desired, with its ends abutting, passing a heating-current of electricity through the joint and through the portion of the blank diametrically opposite the joint, and then subjecting the object to endwise pressure, so as to weld the joint and at the same time upset the metal at a continuous part of the object.

7. The herein-described process of making chains, which consists in first constructing a suitable length of chain of links connected together without joint or weld and subsequently thereto welding the links to form a complete welded chain of high tensile strength.

8. The herein-described method or process of making chains, which consists in first constructing a chain the members of which are threaded or linked together without joint or weld and subsequently thereto passing a heating electric current through the link at the point where the joint or weld is to be formed and subjecting the link to pressure suitable to produce the weld.

9. The herein-described process of making chains, consisting in cutting off sections of metal, bending them and linking them together to form a chain, and afterward welding the links by the passage of an electric current through the meeting ends of each bent link.

10. The herein-described method of making a chain, consisting in bending the separate pieces to form links and at the same time threading each one through a previously-formed link, and then welding the joint in the link by electricity, either while the chain is being formed or after a certain length of chain has been formed by the bending operation.

11. The herein-described improvement in manufacturing chains, consisting in cutting off suitable sections of metal of desired length, bending and threading the same together, and welding the bent ends of each link together as each is formed or after the formation of a suitable length of chain of unwelded links, as and for the purpose described.

Signed at Lynn, in the county of Essex and State of Massachusetts, this 21st day of April, A. D. 1890.

ELIHU THOMSON.

Witnesses:
   JOHN W. GIBBONEY,
   H. LEMP.